United States Patent
Cho et al.

(10) Patent No.: US 7,835,585 B2
(45) Date of Patent: Nov. 16, 2010

(54) METHOD AND DEVICE FOR PROCESSING AN IMAGE SIGNAL

(75) Inventors: Jin-Soo Cho, Yongin-si (KR); Jong-Woo Bae, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 946 days.

(21) Appl. No.: 11/674,806

(22) Filed: Feb. 14, 2007

(65) Prior Publication Data

US 2007/0189633 A1  Aug. 16, 2007

(30) Foreign Application Priority Data

Feb. 16, 2006 (KR) ............... 10-2006-0015314

(51) Int. Cl.
  *G06K 9/40* (2006.01)
(52) U.S. Cl. ............... 382/260; 382/199; 382/266
(58) Field of Classification Search ............... 327/354; 348/252, 597, 625, E5.052; 382/199, 260, 382/266, 307; 700/42, 43; 701/42; 702/FOR. 151; 708/201
  See application file for complete search history.

(56) References Cited

U.S. PATENT DOCUMENTS

| | | | | |
|---|---|---|---|---|
| 4,414,564 A | * | 11/1983 | Hitchcock | 348/625 |
| 5,321,511 A | | 6/1994 | Min | |
| 5,739,820 A | * | 4/1998 | Lyon | 345/426 |
| 5,799,111 A | * | 8/1998 | Guissin | 382/254 |
| 6,618,097 B1 | | 9/2003 | Yamada | |
| 2003/0156223 A1 | * | 8/2003 | Min | 348/625 |
| 2005/0008251 A1 | * | 1/2005 | Chiang | 382/266 |

FOREIGN PATENT DOCUMENTS

JP  2001-257909  9/2001

OTHER PUBLICATIONS

English Abstract for Publication No. 2001-257909, Sep. 21, 2001.

* cited by examiner

*Primary Examiner*—Matthew C Bella
*Assistant Examiner*—Gregory F Cunningham
(74) *Attorney, Agent, or Firm*—F. Chau & Associates, LLC (57) ABSTRACT

A method for processing an image signal includes evaluating an edge factor based on a characteristic of an original image signal. A gain-adjusted calibration signal is generated based on the edge factor. The original image signal and the gain-adjusted calibration signal are summed to generate a transient-improved image signal. Accordingly, an image signal transient is adaptively improved depending on edge characteristic.

18 Claims, 7 Drawing Sheets

FIG. 1A
(PRIOR ART)

(1) INPUT SIGNAL

FIG. 1B
(PRIOR ART)

(2) NORMALIZED FIRST DERIVATIVE

FIG. 1C
(PRIOR ART)

(3) SECOND DERIVATIVE

FIG. 1D
(PRIOR ART)

(4)(FIRST DERIVATIVE) X (SECOND DERIVATIVE)

FIG. 1E
(PRIOR ART)

(5)OUTPUT SIGNAL=(1)+(4)

METHOD AND DEVICE FOR PROCESSING AN IMAGE SIGNAL

CROSS-REFERENCE TO RELATED APPLICATIONS

This application claims priority under 35 USC §119 to Korean Patent Application No. 10-2006-0015314, filed on Feb. 16, 2006, in the Korean Intellectual Property Office (KIPO), the disclosure of which is herein incorporated by reference in its entirety.

BACKGROUND OF THE INVENTION

1. Technical Field

The present disclosure relates to improvement of image quality, and more particularly to a method and a device for processing an image signal, and a display system including the image processing device.

2. Discussion of the Related Art

Techniques for the transient improvement of an image signal increases clarity of the image by increasing sharpness and decreasing edge transition time. When the transient improvement technique is applied to a luminance signal, the technique is referred to as a Luminance Transient Improvement technique.

Typically, the transient improvement technique is used to make the image look sharper by decreasing transition time.

FIGS. 1A through 1E are waveform diagrams illustrating signals according to a conventional image quality improvement process.

Figure 1A:
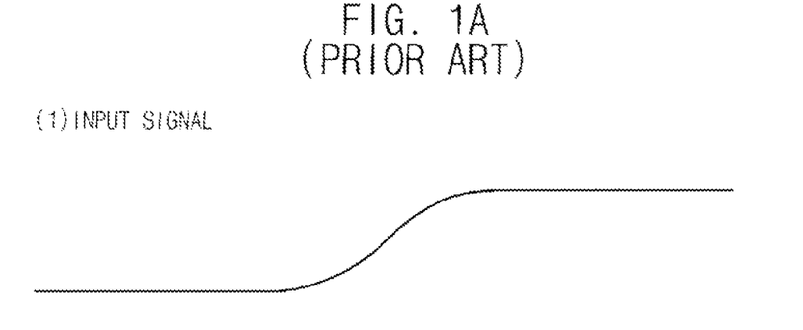
FIGS. 1A through 1E are waveform diagrams illustrating signals in a conventional image quality improvement process.

FIG. 1A illustrates an image signal to be inputted to an image quality improvement device.

Figure 1B:
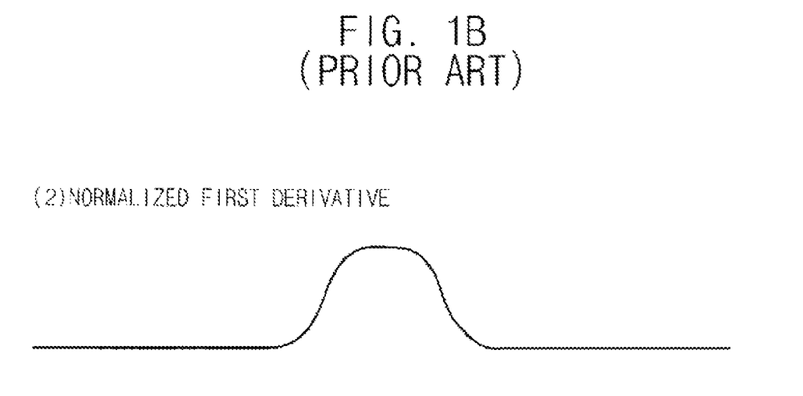
Figure 1C:
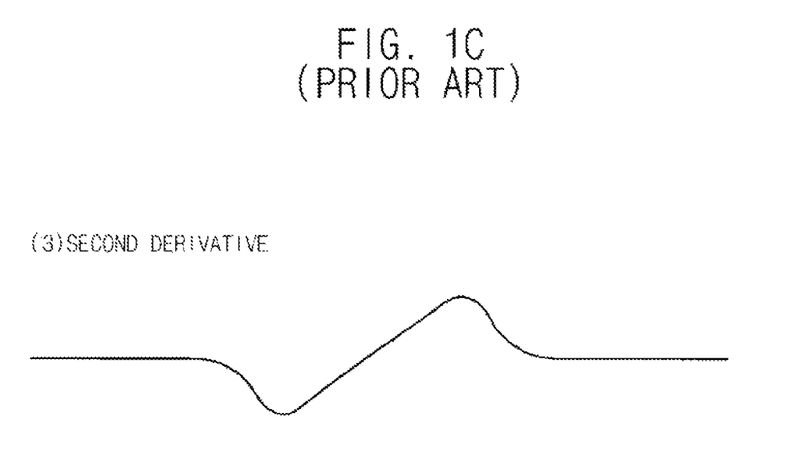

The image quality improvement device generates first and second derivative signals of an image signal. The first and second derivative signals are shown in FIGS. 1B and 1C, respectively.

Figure 1D:
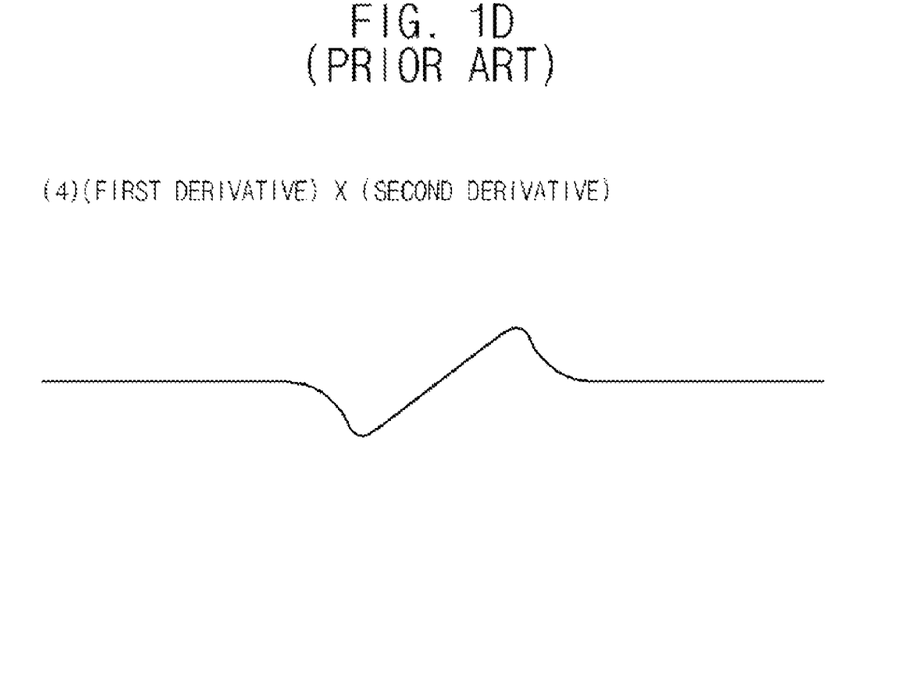

The image quality improvement device generates a calibration signal shown in FIG. 1D by multiplying the first derivative signal by the second derivative signal. A sharpened image signal shown in FIG. 1E is generated by summing the image signal shown in FIG. 1A and the calibration signal shown in FIG. 1D.

Figure 1E:
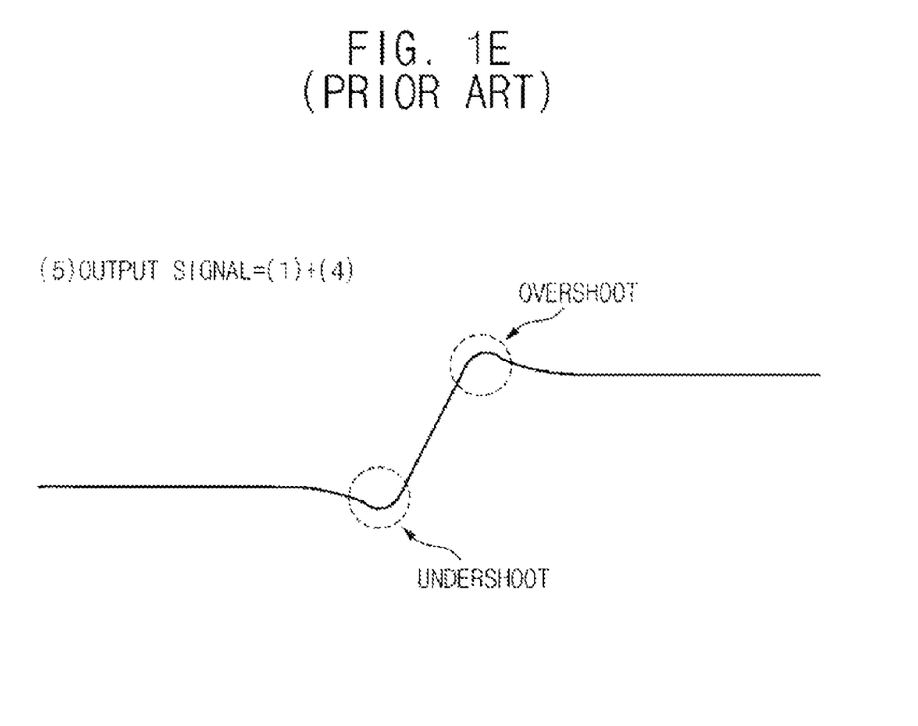

The sharpened image signal shown in FIG. 1E has a short transition time compared with the image signal shown in FIG. 1A, but the sharpened image includes overshoot and undershoot. The overshoot and undershoot may make the image clear but may also degrade image quality by distorting the original image. As gain is increased, the overshoot and undershoot become larger.

Edge represents the portion of an image signal where there is a relatively large difference between pixel levels. Overshoot and undershoot occurring at an edge having a low slope may make the image clearer. However, when overshoot and undershoot occur at an edge having a rapid slope, image distortion caused by the overshoot and undershoot outweighs the added image clarity.

SUMMARY OF THE INVENTION

Some exemplary embodiments of the present invention provide methods and devices for processing an image signal, capable of adaptively improving an image signal transient depending on edge characteristic.

Some exemplary embodiments of the present invention provide display systems for displaying an image that has been improved based on edge characteristics.

In some exemplary embodiments of the present invention, a method for processing an image signal is provided. The method includes generating an edge factor depending on an edge characteristic of an original image signal. A gain-adjusted calibration signal is generated. The gain is adjusted based on the edge factor. The original image signal and the calibration signal are summed to generate a transient-improved image signal. The original image signal may be a luminance signal.

Generating the edge factor may include generating an edge estimation value of the original image signal and normalizing the edge estimation value to generate the edge factor.

Generating the edge estimation value may include generating first and second derivatives of the original image signal. An absolute value of the second derivative is obtained. The edge estimation value is obtained based on the first derivative and the absolute value of the second derivative. The edge estimation value may be a sum of the first derivative and the absolute value of the second derivative.

Generating the edge factor may include normalizing the edge estimation value and generating the edge factor by subtracting the normalized edge estimation value from 1. Normalizing the edge estimation value may include generating the normalized edge estimation value by multiplying the edge estimation value and a reference value and setting the normalized estimation value to 1 when the normalized estimation value is more than 1.

Generating the gain-adjusted calibration signal may include generating first and second derivatives of the original image signal and multiplying the first derivative, second derivative and the edge factor.

In some exemplary embodiments, the method for processing the image signal may further include providing a user-tunable gain. Generating the gain-adjusted calibration signal may include generating the first and second derivatives of the original image signal and multiplying the first derivative, the second derivative, the edge factor and the user-tunable gain.

In some exemplary embodiments of the present invention, a device for processing an image signal includes an edge factor generator configured to generate an edge factor depending on an edge characteristic of an original image signal. A calibration signal generator generates a gain-adjusted calibration signal. The gain is adjusted based on the edge factor. An adder generates a transient-improved image signal by summing the original image signal and the gain-adjusted calibration signal. The original image signal may be a luminance signal.

The edge factor generator may include an edge estimation value calculator configured to calculate an edge estimation value of the original image signal. The edge factor generator may also include an edge factor generator configured to provide the edge factor by normalizing the edge estimation value.

The edge estimation value calculator may include an ABS unit configured to obtain an absolute value of a second derivative of the original image signal. The edge estimation value calculator may also include an adder configured to sum a first derivative of the original signal and the absolute value of the second derivative.

The edge factor generator may include a normalizer configured to normalize the edge estimation value and a subtracter configured to calculate the edge factor by subtracting the normalized edge estimation value from 1. The normalizer may be configured to normalize the edge estimation value by multiplying the edge estimation value by a reference value. The normalizer may also be configured to set the normalized edge estimation value to 1 when the normalized edge estimation value is more than 1.

In some exemplary embodiments, the calibration signal generator may include a derivative unit configured to generate first and second derivatives of the original signal. The calibration signal generator may also include a multiply unit configured to generate the calibration signal by multiplying the first derivative by the second derivative and a variable gain unit configured to adjust a gain of the calibration signal based on the edge factor.

In some exemplary embodiments, the calibration signal generator may include a derivative unit configured to generate first and second derivatives of the original image signal. The calibration signal generator may also include a multiply unit configured to generate the calibration signal by multiplying the first derivative by the second derivative. A variable gain unit configured to adjust a gain of the calibration signal based on the edge factor and a user-tunable gain may also be included in the calibration signal generator.

In some exemplary embodiments of the present invention, a display system includes an image source, an image processing device and a display device. The image source provides an original image signal. The image processing device processes the original image signal. A display device displays an image based on an output of the image processing device.

The image processing device includes an edge factor generator configured to generate an edge factor depending on an edge characteristic of the original image signal. A calibration signal generator generates a gain-adjusted calibration signal based on the edge factor. An adder generates a transient-improved image signal by summing the original image signal and the gain-adjusted calibration signal. The original image signal may be a luminance signal.

The edge factor generator may include an edge estimation value calculator configured to calculate an edge estimation value of the original image signal and an edge factor generator configured to generate the edge factor by normalizing the edge estimation value.

The edge estimation value calculator may include an ABS unit configured to obtain an absolute value of a second derivative of the original image signal. The edge estimation value calculator may also include an adder configured to sum a first derivative of the original signal and the absolute value of the second derivative.

The edge factor generator may include a normalizer configured to normalize the edge estimation value and a subtracter configured to calculate the edge factor by subtracting the normalized edge estimation value from 1. The normalizer may be configured to normalize the edge estimation value by multiplying the edge estimation value and a reference value. The normalizer may be configured to set the normalized estimation value to 1 when the normalized estimation value is more than 1.

The calibration signal generator may include a derivative unit configured to generate the first and second derivatives of the original signal. The calibration signal generator may also include a multiply unit configured to generate the calibration signal by multiplying the first derivative by the second derivative. A variable gain unit configured to adjust a gain of the calibration signal based on the edge factor may also be included in the calibration signal generator.

In some embodiments, the calibration signal generator may include a derivative unit configured to generate the first and second derivatives of the original image signal, a multiply unit configured to generate the calibration signal by multiplying the first derivative by the second derivative, and a variable gain unit configured to adjust a gain of the calibration signal based on the edge factor and a user-tunable gain.

BRIEF DESCRIPTION OF THE DRAWINGS

These and/or other aspects and features of the exemplary embodiment of the present invention are described below in conjunction with the accompanying drawings of which.

DESCRIPTION OF THE EXEMPLARY EMBODIMENTS

Exemplary embodiments of the present invention are described below with reference to the accompanying drawings. The invention may, however, be embodied in many different forms and should not be construed as limited to the exemplary embodiments set forth herein. Like reference numerals may refer to like elements throughout this application.

It will be understood that when an element is referred to as being "connected" or "coupled" to another element, it can be directly connected or coupled to the other element or intervening elements may be present. Other words used to describe the relationship between elements should be interpreted in a like fashion (e.g., "between," "adjacent," etc.).

Figure 2:
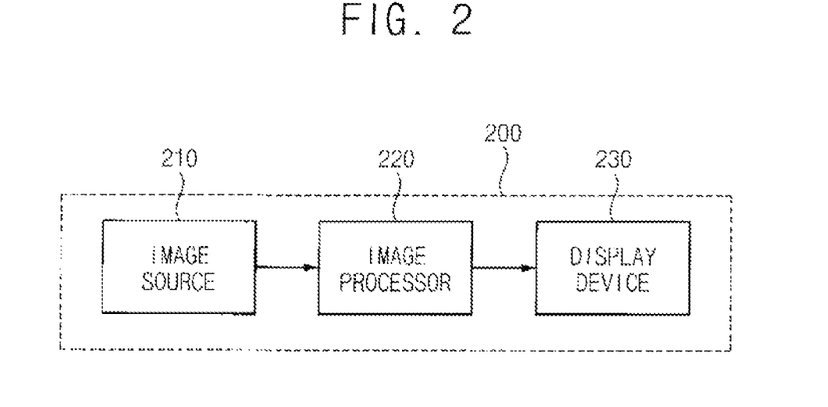
FIG. 2 is a block diagram illustrating a display system according to an exemplary embodiment of the present invention.

FIG. 2 is a block diagram illustrating a display system according to an exemplary embodiment of the present invention.

The display system 200 includes an image source 210, an image processor 220 and a display device 230.

The image source 210 provides an original image to be displayed. The image source 210 may be implemented according to the display system 200. For example, when the display system 200 is a digital TV, the image source 210 may include an RF receiver, a demultiplexer, a video decoder and the like. The RF receiver receives a broadcast signal and the demultiplexer separates a video signal from the received broadcast signal. The video decoder decodes the separated video signal and provides an image signal. The image signal is reconstructed through the decoding process to the image processor 220. For example, when the display system 200 is a digital camera, the image source 210 includes an image sensor, an analog-to-digital (A/D) converter and the like. The A/D converter converts the analog image signal outputted from the image sensor to a digital image signal and provides the digital signal to an image processor 220.

The image processor 220 processes the original image provided from the image source 210. The image processor 220 may adjust a shade or a sharpness of the original image.

The image processor 220 may adjust a contrast of the original image. The image processor 220 may be implemented with a plurality of hardware devices each performing one or more of the above functions. Alternatively, one or more of the above functions may be implemented with a single hardware device. The processor 220 may also be implemented with software including instructions for performing the above functions and a digital signal processor (DSP) executing the instructions included in the software. The image quality improvement device according to an exemplary embodiment the present invention improves the edge transition characteristic of the original image based on the edge characteristic.

The display device 230 displays a quality-improved image outputted from the image processor 220. The display device 230 may be, for example, an LCD, OLED, CRT, PDP or the like.

Figure 3:
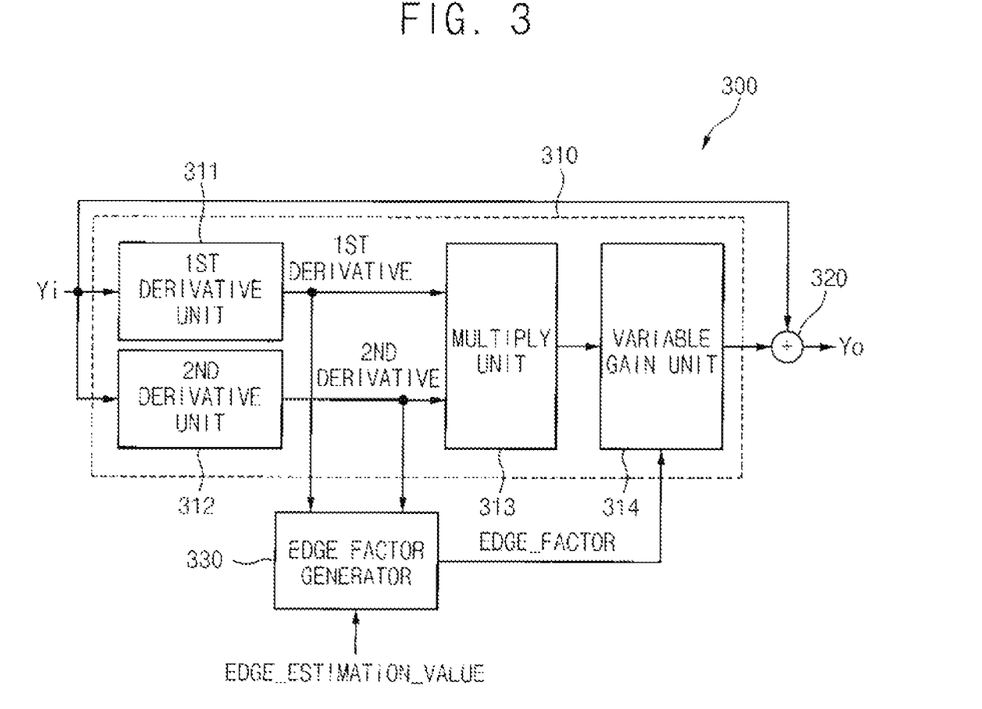
FIG. 3 is a block diagram illustrating an image quality improvement device according to an exemplary embodiment of the present invention.

FIG. 3 is a block diagram illustrating an image quality improvement device according to an exemplary embodiment of the present invention.

The image quality improvement device 300 includes a calibration signal generator 310, an edge factor generator 330 and an adder 320. The original image signal Yi inputted to the image quality improvement device 300 may be a luminance signal. When the original image signal Yi is a luminance signal, the image quality improvement device 300 may improve transition characteristic of the luminance signal.

The calibration signal generator 310 is configured to generate a calibration signal for improving transient characteristic of the inputted original image signal Yi. The calibration signal generates a transient-improved image signal having a reduced edge transition time. The calibration signal generator 310 includes a first differential circuit 311 (first derivative unit), a second differential circuit 312 (second derivative unit), a multiply unit 313 and a variable gain unit 314.

The first differential circuit 311 generates a first derivative of the original image signal Yi and the second differential circuit 312 generates a second derivative of the original image signal Yi. In the exemplary embodiments described above with reference to FIG. 3, the original image signal Yi is inputted directly to the second differential circuit 312. The image quality improvement device 300 may also be implemented such that the first derivative is inputted to the second differential circuit 312. Alternatively, a single differential circuit may also be configured to generate both the first and second derivatives of the original image signal.

The multiply unit 313 generates the calibration signal by multiplying the first derivative by the second derivative. The variable gain unit 314 adjusts a gain of the calibration signal based on an edge factor. In some exemplary embodiments, the variable gain unit 314 generates the gain-adjusted calibration signal by multiplying the calibration signal by the edge factor. The edge factor is provided from the edge factor generator 330.

The edge factor generator 330 evaluates the edge factor corresponding to edge characteristic of the original image signal Yi. In some exemplary embodiments, the edge factor generator 330 generates the edge factor based on the first and second derivatives of the original image signal Yi. The edge factor generator 330 is described below with reference to FIG. 4.

The adder 320 generates a transient-improved image signal Yo by summing the original image signal Yi and the calibration signal. The magnitude of overshot and undershoot of the transient-improved image signal Yo is decreased at rapid sloped edges and is increased at slow sloped edges.

Figure 4:
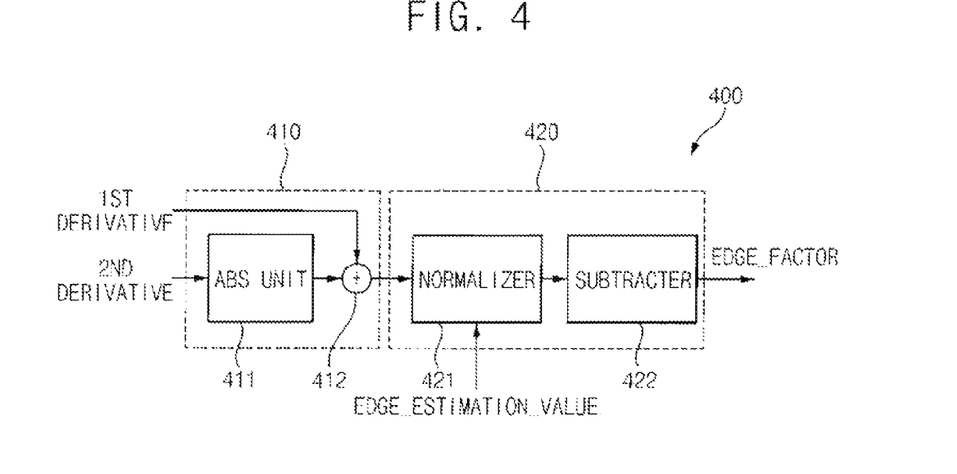
FIG. 4 is a block diagram illustrating the edge factor generator in FIG. 3.

FIG. 4 is a block diagram illustrating the edge factor generator 330 of FIG. 3.

The edge factor generator 400 includes an edge estimation value calculator 410 configured to evaluate an edge estimation value of the original image signal. The edge factor generator 400 also includes an edge factor provider 420 configured to provide an edge factor based on the edge estimation value. In some exemplary embodiments, the edge factor generator 400 generates the edge factor based on first and second derivatives of the original image signal.

The edge estimation value calculator 410 receives the first and second derivatives and evaluates the edge estimation value. The edge estimation value calculator 410 may include an ABS unit 411 configured to perform an absolute value operation on an inputted signal. The edge estimation value calculator 410 may also include and an adder 412. The ABS unit 411 obtains an absolute value of the second derivative. The adder 412 sums the first derivative and the absolute value of the second derivative.

The edge factor may be heavily influenced by noise included in the image signal when an edge characteristic is estimated based on the first derivative. Accordingly, the edge factor generator 400 uses the second derivative in addition to the first derivative.

The edge factor provider 420 evaluates the edge factor based on the edge estimation value and provides the edge factor. The edge factor provider 420 may include a normalizer 421 and a subtracter 422.

The normalizer 421 evaluates a normalized edge estimation value by multiplying the edge estimation value by a reference value. In some exemplary embodiments, the normalizer 421 sets the normalized edge estimation value to "1" when the normalized edge estimation value is more than "1."

The subtracter 422 evaluates the edge factor by subtracting the normalized edge estimation value from "1."

The edge estimation value, the normalized edge estimation value and the edge factor may be calculated by Equation. 1.

$$\text{edge\_value} = \text{first\_diff} + \text{abs}(\text{second\_diff})$$

$$\text{norm} = (\text{edge\_value} * \text{REG\_USER\_NORMALIZATION})/256$$

$$\text{edge\_factor} = 1 - \text{norm} \qquad \text{[Equation 1]}$$

The edge_value, norm and edge_factor respectively represent the edge estimation value, the normalized edge estimation value and the edge factor. The first_diff and second_diff respectively represent the first derivative and the second derivative. The abs( ) represents an absolute value of the operand.

The REG_USER_NORMALIZATION corresponds to a threshold value of the edge estimation value when the gain of the variable gain unit 314 in FIG. 3 becomes zero. This value may be established by a user. For example, when the REG_USER_NORMALIZATION is established as 30, the transient improvement technique is not applied when the edge estimation value is more than 30. Accordingly the gain of the variable gain unit 314 in FIG. 3 becomes zero and the output image signal Yo is identical to the original image signal Yi.

When the original image signal is an 8-bit luminance signal, in equation 1, when evaluating the norm, the edge_value multiplied by REG_USER_NORMALIZATION is divided by 256. When the original image signal is a 6-bit luminance signal, the edge_value multiplied by REG_USER_NORMALIZATION is divided by 64 to evaluate the norm.

The gain of the calibration signal adjusted by the variable gain unit 314 is determined by Equation 2.

$$\text{crisp\_gain} = \text{first\_diff} * \text{second\_diff} * \text{edge\_factor} \qquad \text{[Equation 2]}$$

The crisp_gain represents the gain of the calibration signal.

When evaluating the edge estimation value, the first derivative is added to the second derivative in equal weight as shown in the Equation 1. Alternatively, the first and second derivative may be added with different weight as shown in Equation 3.

$$edge\_value = a*first\_diff + b*abs(second\_diff) \quad \text{[Equation 3]}$$

In equation 3, a and b represent weight values respectively multiplied to the first derivative and the absolute value of the second derivative.

The image quality improvement device 300 in FIG. 3 adaptively adjusts the gain of the calibration signal according to the edge characteristic. For example, the image quality improvement device 300 generates a high gain calibration signal at slow sloped edges, and generates the low gain calibration signal at rapid sloped edges. When the slope of an edge becomes larger such that the edge estimation value is more than REG_USER_NORMALIZATION, the image quality improvement device 300 outputs the original signal without calibration.

The image quality improvement device 300 in FIG. 3 adaptively controls the transient characteristic of the image signal depending on the edge characteristic. The gain of the calibration signal from the image quality improvement device 300 is automatically determined according to the edge characteristic. The image quality improvement device may be further controlled by adjusting the degree of the image signal transient improvement as described below with reference to FIG. 5.

Figure 5:
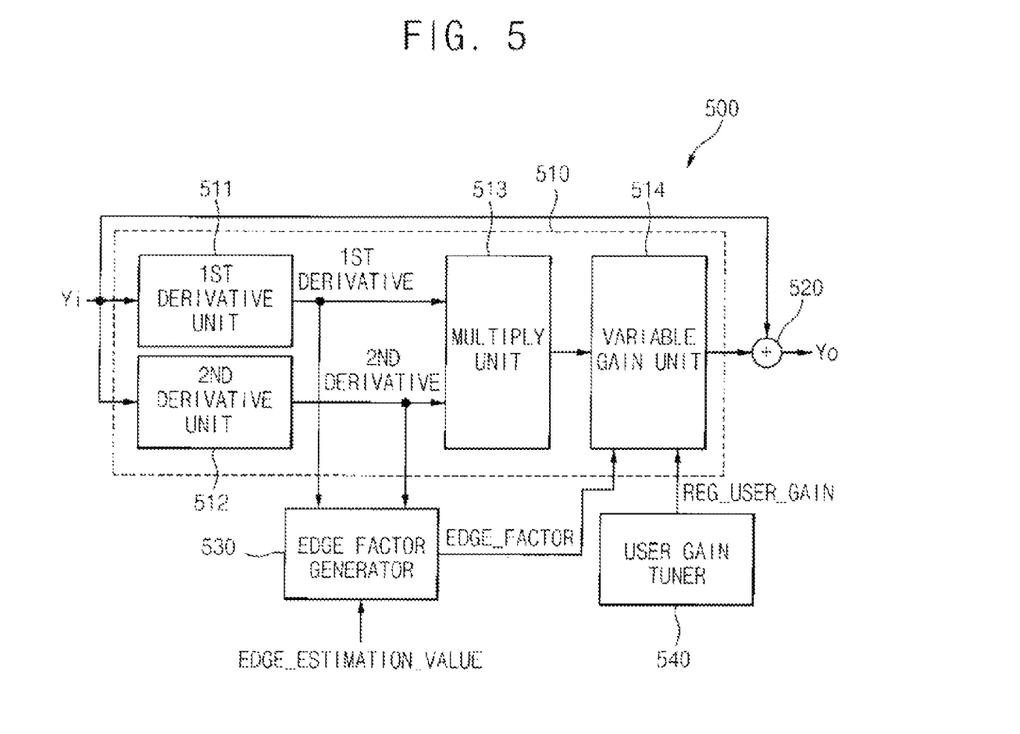
FIG. 5 is a block diagram illustrating an image quality improvement device according to an exemplary embodiment of the present invention.

FIG. 5 is a block diagram illustrating an image quality improvement device according to an exemplary embodiment of the present invention.

The image quality improvement device 500 includes a calibration signal generator 510, an edge factor generator 530 and an adder 520. The image quality improvement device 500 further includes a user gain tuner 540 adjusting a degree of the image signal transient improvement. In some exemplary embodiments, the original image signal Yi inputted to the image quality improvement device 500 is a luminance signal and the image quality improvement device 500 improves a transient characteristic of the luminance signal.

Functions of the calibration signal generator 510, the edge factor generator 530, the multiply unit 513 and the adder 520 are similar or substantially identical to those of the calibration signal generator 310, the edge factor generator 330, the multiply unit 313 and the adder 320 in FIG. 3.

The image quality improvement device 500 further includes a user gain tuner 540. The variable gain unit 514 determines the gain of the calibration signal depending on the user-tunable gain as well as the edge factor.

The user-tunable gain provided from the user gain tuner 540 may be established by a user or an external circuit. For example, the user gain tuner 540 may include a user-tunable gain resister (not shown). The user-tunable gain is stored in the user-tunable gain resister.

The gain of the calibration signal, which is adjusted by the variable gain unit 514, is determined by Equation 4.

$$crisp\_gain = REG\_USER\_GAIN * first\_diff * second\_diff * edge\ factor \quad \text{[Equation 4]}$$

In equation 4, REG_USER_GAIN represents the user-tunable gain.

Figure 6:
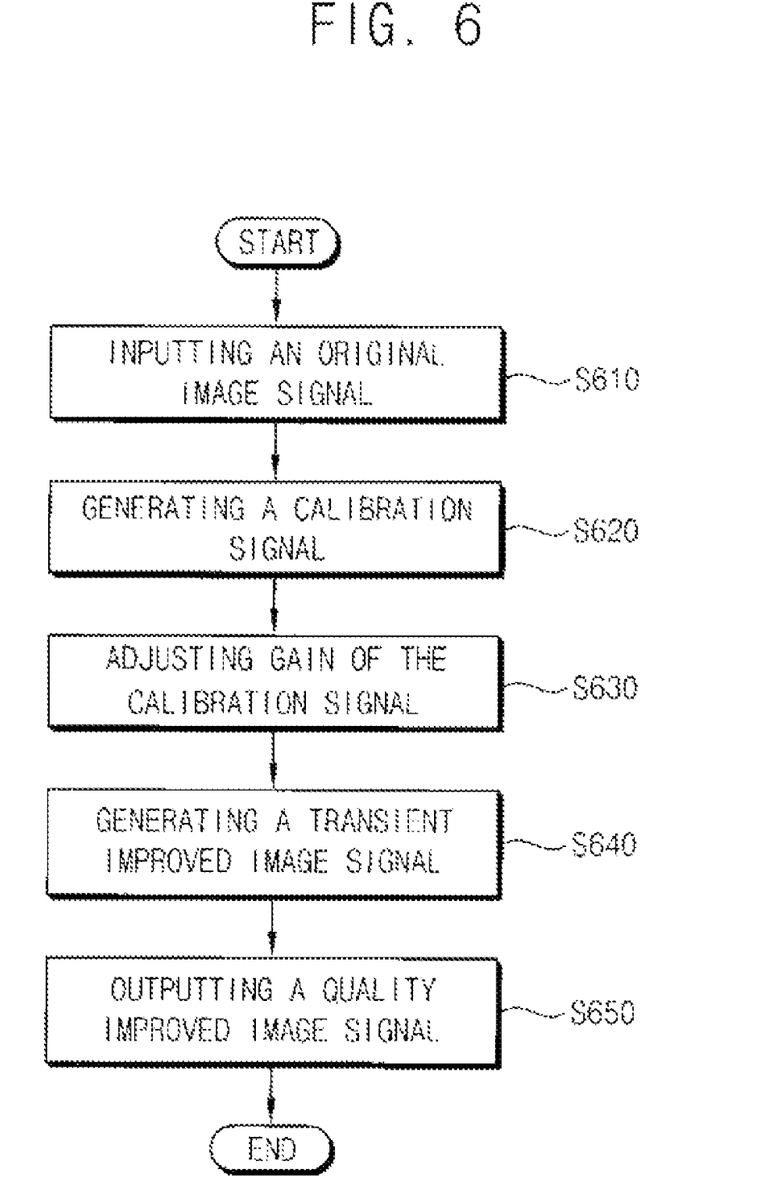
FIG. 6 is a flow chart illustrating an image quality improvement process according to an exemplary embodiment of the present invention.

FIG. 6 is a flow chart illustrating an image quality improvement process according to an exemplary embodiment of the present invention.

The image quality improvement device receives an original image signal (Step S610).

The image quality improvement device generates a calibration signal for generating a transient improvement image signal (Step S620). In some exemplary embodiments, the image quality improvement device generates first and second derivatives of the original image signal and generates the calibration signal by multiplying the first derivative by the second derivative.

The image signal improvement device adjusts a gain of the calibration signal (Step S630), after the calibration signal is generated. A process of adjusting the gain of the calibration signal is described below with reference to FIG. 7.

The image quality improvement device generates a transient-improved image signal (Step S640), for example, by summing the original image signal and a gain-adjusted calibration signal after adjusting the gain of the calibration signal.

The image quality improvement device outputs a quality-improved image signal to the display device (Step S650) after the transient-improved image signal is generated.

Figure 7:
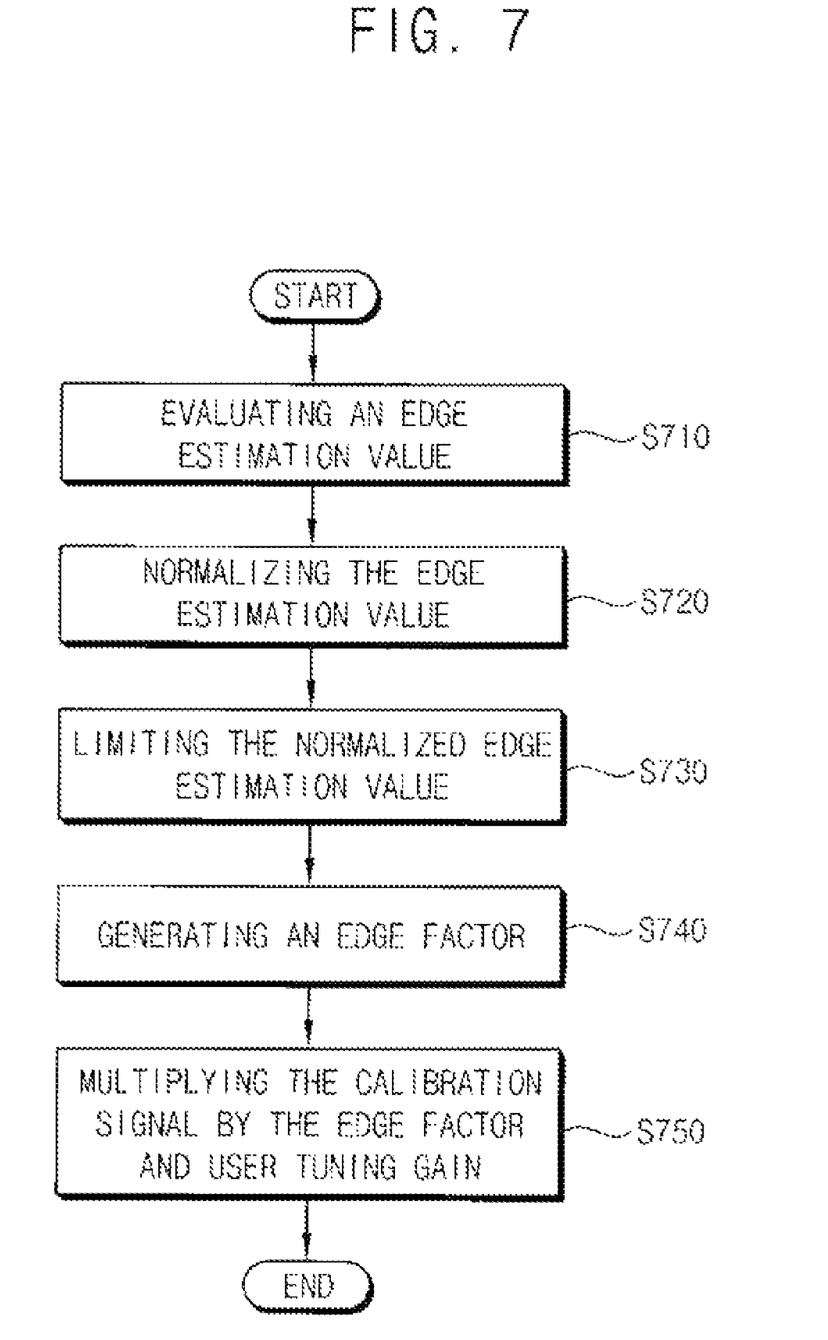
FIG. 7 is a flow chart illustrating a process of adjusting gain of the calibration signal in FIG. 6.

FIG. 7 is a flow chart illustrating a process of adjusting gain of the calibration signal (Step S630) of FIG. 6.

The image quality improvement device evaluates an edge estimation value for adjusting gain of the calibration signal (Step S710). In some exemplary embodiments, the edge estimation value is obtained by summing a first derivative of the original image signal and an absolute value of a second derivative of the original image signal.

The image quality improvement device normalizes the edge estimation value (Step S720) by multiplying the edge estimation value by a reference value after the edge estimation value is evaluated. The edge estimation value is limited to a predetermined value (Step S730). For example, the edge estimation value may be limited to "1" when the edge estimation value is more than "1."

The image quality improvement device generates the edge factor using the normalized edge estimation value (Step S740). The edge factor may have a value between "0" and "1." the edge factor may be set to "0" at rapid sloped edges, and the edge factor may have a value between "0" and "1" at slow sloped edges.

The image quality improvement device multiplies the calibration signal by the edge factor and a user-tunable gain (Step S750), after the edge factor is generated. The gain-adjusted calibration signal is dependent upon an edge characteristic. In addition, the gain-adjusted calibration signal is dependent upon the user-tunable gain. The image quality improvement device can improve subjective image quality in accordance with user preferences.

Figure 8:
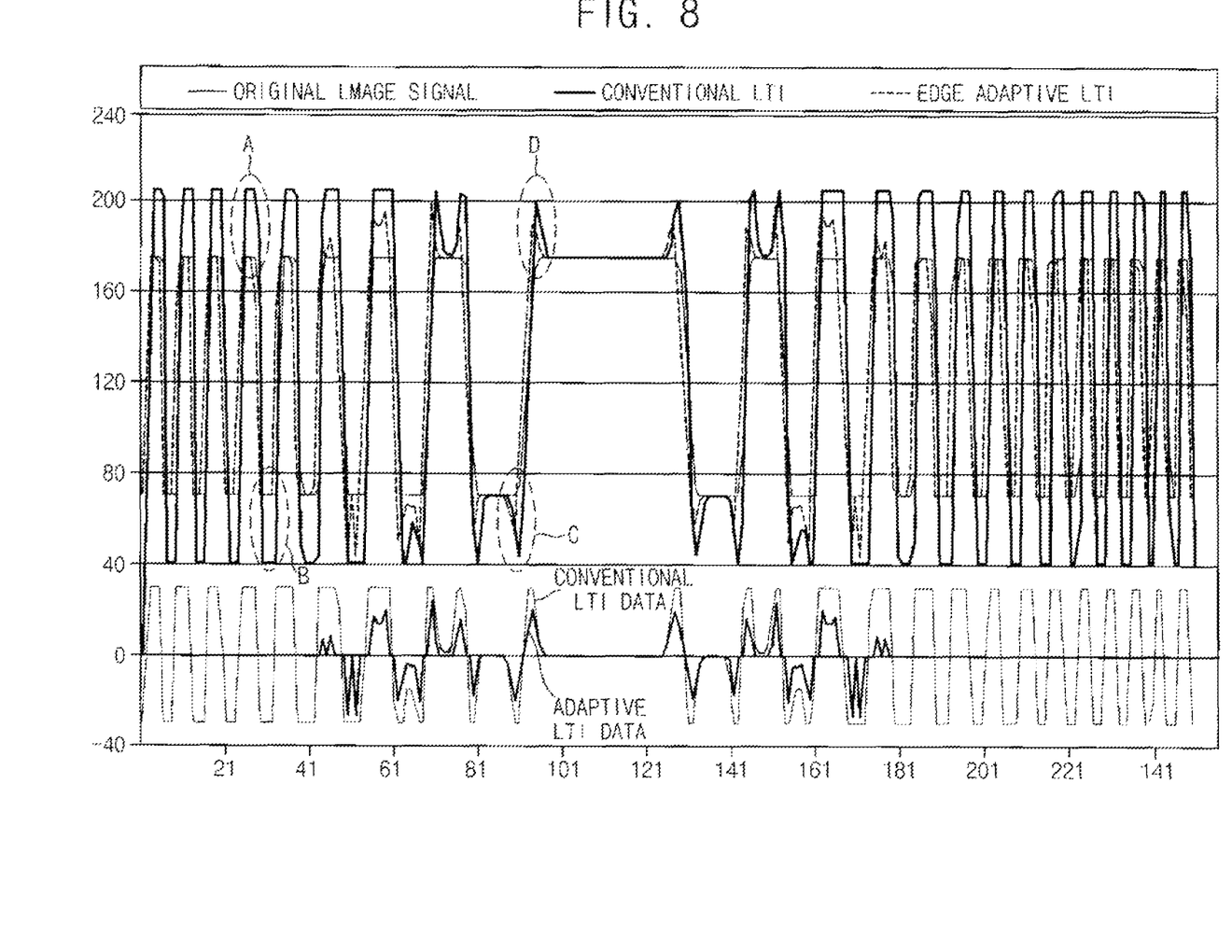
FIG. 8 is a diagram illustrating an image quality improvement effect according to an exemplary embodiment of the present invention.

FIG. 8 is a diagram illustrating an image quality improvement effect according to an exemplary embodiment of the present invention.

An original image signal, shown in FIG. 8 with a thin solid line, has a rapid sloped edge in regions A and B. Overshoot occurs in region A and undershoot occurs in region B when the original image signal is processed based on a conventional LTI (Luminance Transient Improvement) data, shown in FIG. 8 with a thick solid line. However, when the original image signal is processed based on an adaptive LTI data according to an exemplary embodiment of the present invention, shown in FIG. 8 with a dotted line, overshoot and undershoot are prevented in regions A and B, respectively. Because the conventional LTI technique is also applied at rapid sloped edges, the image quality may be degraded. However, the adaptive LTI technique according to the exemplary embodiment of the present invention prevents and/or reduces overshoot and undershoot at rapid sloped edges.

The original image signal has a slow sloped edges in regions C and D. When applying the conventional LTI technique and the adaptive LTI technique according to the exemplary embodiment of the present invention, undershoot occurs in region C and overshoot occurs in region D. For example, if overshoot and undershoot occur in slow sloped edges, the image quality may be improved without causing a distortion of the image.

As described above, a method according to at least one exemplary embodiment of the present invention for adaptively improving an image signal transient depending on edge characteristic and the device for improving an image quality increase the gain of the calibration signal for an edge having a relatively slow slope to enhance sharpness of the displayed image. The gain of the calibration signal is decreased for an edge having a relatively rapid slope to prevent excessive distortion of the displayed image. Accordingly, the image signal transient may be adaptively improved by using the calibration signal of which the gain is adjusted based on an edge characteristic.

While the exemplary embodiments of the present invention have been described in detail, it should be understood that various changes, substitutions and alterations may be made herein without departing from the scope of the invention.

What is claimed is:

1. A method for processing an image signal, comprising:
   generating an edge factor depending on an edge characteristic of an original image signal;
   generating a gain-adjusted calibration signal based on the edge factor; and
   summing the original image signal and the gain-adjusted calibration signal to generate a transient-improved image signal,
   wherein the edge factor is generated by normalizing an edge estimation value of the original image signal, and the edge estimation value of the original image signal is generated by summing an absolute value of a second derivative of the original image signal and a first derivative of the original image signal, and
   wherein the above steps are performed using an image processor.

2. The method of claim 1, wherein the original image signal is a luminance signal.

3. The method of claim 1, wherein generating the edge factor comprises:
   normalizing the edge estimation value; and
   generating the edge factor by subtracting the normalized estimation value from 1.

4. The method of claim 3, wherein normalizing the edge estimation value comprises:
   generating the normalized edge estimation value by multiplying the edge estimation value by a reference value; and
   setting the normalized estimation value to 1 when the normalized estimation value is more than 1.

5. The method of claim 1, wherein generating the gain-adjusted calibration signal comprises:
   generating the first derivative and the second derivative; and
   multiplying the first derivative, the second derivative and the edge factor.

6. The method of claim 1, further comprising providing an user-tunable gain, and wherein generating the gain-adjusted calibration signal comprises:
   generating the first derivative and the second derivative; and
   multiplying the first derivative, the second derivative, the edge factor and the user-tunable gain.

7. A device for processing an image signal, comprising:
   an edge factor generator configured to generate an edge factor depending on an edge characteristic of an original image signal;
   a calibration signal generator configured to generate a gain-adjusted calibration signal based on the edge factor; and
   an adder configured to generate a transient-improved image signal by summing the original image signal and the gain-adjusted calibration signal for display using a display device,
   wherein the edge factor is generated by normalizing an edge estimation value of the original image signal, and the edge estimation value of the original image signal is generated by summing an absolute value of a second derivative of the original image signal and a first derivative of the original image signal.

8. The device of claim 7, wherein the original image signal is a luminance signal.

9. The device of claim 7, wherein the edge factor generator comprises:
   a normalizer configured to normalize the edge estimation value; and
   a subtracter configured to calculate the edge factor by subtracting the nor-normalized edge estimation value from 1.

10. The device of claim 9, wherein the normalizer is configured to normalize the edge estimation value by multiplying the edge estimation value by a reference value, and is configured to set the normalized edge estimation value to 1 when the normalized edge estimation value is more than 1.

11. The device of claim 7, wherein the calibration signal generator comprises:
    a derivative unit configured to generate the first derivative and second derivative; and
    a multiply unit configured to generate the calibration signal by multiplying the first derivative by the second derivative; and
    a variable gain unit configured to adjust a gain of the calibration signal based on the edge factor.

12. The device of claim 7, wherein the calibration signal generator comprises:
    a derivative unit configured to generate the first and the second derivative;
    a multiply unit configured to generate the calibration signal by multiplying the first derivative by the second derivative; and
    a variable gain unit configured to adjust a gain of the calibration signal based on the edge factor and a user-tunable gain.

13. A display system comprising:
    an image source configured to provide an original image signal;
    an image processing device configured to process the original image signal; and
    a display device configured to display an image based on an output of the image processing device, wherein the image processing device comprises:
    an edge factor generator configured to generate an edge factor depending on an edge characteristic of the original image signal;
    a calibration signal generator configured to generate a gain-adjusted calibration signal based on the edge factor; and
    an adder configured to generate a transient-improved image signal by summing the original image signal and the gain-adjusted calibration signal,
    wherein the edge factor is generated by normalizing an edge estimation value of the original image signal, and the edge estimation value of the original image signal is generated by summing an absolute value of a second derivative of the original image signal and a first derivative of the original image signal.

14. The display system of claim 13, wherein the original image signal is a luminance signal.

15. The display system of claim 13, wherein the edge factor generator comprises:
a normalizer configured to normalize the edge estimation value; and
a subtracter configured to calculate the edge factor by subtracting the normalized edge estimation value from 1.

16. A display system comprising:
an image source configured to provide an original image signal;
an image processing device configured to process the original image signal; and
a display device configured to display an image based on an output of the image processing device, wherein the image processing device comprises:
an edge factor generator configured to generate an edge factor depending on an edge characteristic of the original image signal;
a calibration signal generator configured to generate a gain-adjusted calibration signal based on the edge factor; and
an adder configured to generate a transient-improved image signal by summing the original image signal and the gain-adjusted calibration signal,
wherein the edge factor generator comprises:
an edge estimation value calculator configured to calculate an edge estimation value of the original image signal; and
an edge factor generator configured to generate the edge factor by normalizing the edge estimation value, and
wherein the edge factor generator comprises:
a normalizer configured to normalize the edge estimation value; and
a subtracter configured to calculate the edge factor by subtracting the normalized edge estimation value from 1,
wherein the normalizer is configured to normalize the edge estimation value by multiplying the edge estimation value by a reference value, and is configured to set the normalized estimation value to 1 when the normalized estimation value is more than 1.

17. The display system of claim 13, wherein the calibration signal generator comprises:
a derivative unit configured to generate the first and the second derivative;
a multiply unit configured to generate the calibration signal by multiplying the first derivative by the second derivative; and
a variable gain unit configured to adjust a gain of the calibration signal based on the edge factor.

18. The display system of claim 13, wherein the calibration signal generator comprises:
a derivative unit configured to generate the first and the second derivative;
a multiply unit configured to generate the calibration signal by multiplying the first derivative by the second derivative; and
a variable gain unit configured to adjust a gain of the calibration signal based on the edge factor and user-tunable gain.

* * * * *